United States Patent [19]

Kokel et al.

[11] Patent Number: 5,852,104
[45] Date of Patent: Dec. 22, 1998

[54] AQUEOUS POLYURETHANE DISPERSIONS CONTAINING STRUCTURAL UNITS DERIVED FROM ALKENYL- OR ALKYLSUCCINIC ACID

[75] Inventors: Nicholas Kokel, Ludwigshafen; Karl Häberle, Speyer; Kuno Beutler, Lambsheim; Jürgen Reichert, Limburgerhof; Peter Weyland, Frankenthal; Gabriele Dralle-Voss, Alsbach-Hähnlein; Knut Oppenländer, Ludwigsshafen; Michael Zirnstein, Shriesheim; Gerlinde Tischer, Ruhland; Bernd Guettes, Sallgast; Ulrike Licht, Mannheim, all of Germany

[73] Assignee: BASF Aktiengesellschaft, Ludwigshafen, Germany

[21] Appl. No.: 789,539

[22] Filed: Jan. 27, 1997

[30] Foreign Application Priority Data

Feb. 5, 1996 [DE] Germany .......................... 19603989.4

[51] Int. Cl.⁶ ............................. C08J 3/00; C08K 3/20; C08L 75/00; B32B 27/00
[52] U.S. Cl. .................. 524/591; 156/331.4; 156/331.7; 427/372.2; 427/385.5; 427/389; 427/391; 427/389.9; 427/393.5; 428/423.1; 524/539; 524/591; 524/839; 524/840
[58] Field of Search ..................... 524/539, 591, 524/839, 840; 428/423.1; 427/372.2, 385.5, 388.1, 389, 391, 389.9, 393.5; 156/331.4, 331.7

[56] References Cited

FOREIGN PATENT DOCUMENTS 0 647 667   4/1995   European Pat. Off. .
30 39 271   4/1981   Germany .

*Primary Examiner*—Patrick D. Niland
*Attorney, Agent, or Firm*—Oblon, Spivak, McClelland, Maier & Neudstadt, P.C.

[57] ABSTRACT

Aqueous dispersions containing a polyurethane built up from a) diisocyanates having 4 to 30 carbon atoms,
b) diols, of which
  b.1) from 10 to 100 mol %, based on the total amount of the diols (b), have a molecular weight of from 500 to 5000 and are built up from
    b1.1) ($C_4$- to $C_{30}$-alkyl)succinic acid and/or ($C_4$- to $C_{30}$-alkenyl)succinic acid,
    b1.2) from 0 to 60 mol %, based on component (b1.1), of a dicarboxylic acid which is different from component (b1.1), and
    b1.3) a diol having a molecular weight of from 60 to 500 g/mol,
  b.2) from 0 to 90 mol %, based on the total amount of the diols (b), have a molecular weight of from 60 to 500 g/mol, and
  b.3) from 0 to 90 mol %, based on the total amount of the diols (b), have a molecular weight of from 500 to 5000 g/mol and are different from (b1),
c) monomers which are different from the monomers (a) and (b) and contain at least 2 isocyanate groups or at least 2 isocyanate-reactive groups and which in addition carry at least one hydrophilic group or a potentially hydrophilic group, thus achieving the water-dispersibility of polyurethanes,
d) if desired, further polyfunctional compounds which are different from the monomers (a) to (c) and contain reactive groups which are alcoholic hydroxyl groups, primary or secondary amino groups or isocyanate groups, and
e) if desired, monofunctional compounds which are different from the monomers (a) to (c) and contain one reactive group, which is an alcoholic hydroxyl group, a primary or secondary amino group or an isocyanate group.

4 Claims, No Drawings

AQUEOUS POLYURETHANE DISPERSIONS CONTAINING STRUCTURAL UNITS DERIVED FROM ALKENYL- OR ALKYLSUCCINIC ACID

DESCRIPTION

The present invention relates to aqueous dispersions containing a polyurethane built up from a) diisocyanates having 4 to 30 carbon atoms, b) diols, of which b.1) from 10 to 100 mol %, based on the total amount of the diols (b), have a molecular weight of from 500 to 5000 and are built up from b1.1) ($C_4$- to $C_{30}$-alkyl)succinic acid and/or ($C_4$- to $C_{30}$-alkenyl)succinic acid, b1.2) from 0 to 60 mol %, based on component (b1.1), of a dicarboxylic acid which is different from component (b1.1), and b1.3) a diol having a molecular weight of from 60 to 500 g/mol, b.2) from 0 to 90 mol %, based on the total amount of the diols (b), have a molecular weight of from 60 to 500 g/mol, and b.3) from 0 to 90 mol %, based on the total amount of the diols (b), have a molecular weight of from 500 to 5000 g/mol and are different from (b1), c) monomers which are different from the monomers (a) and (b) and contain at least 2 isocyanate groups or at least 2 isocyanate-reactive groups and which in addition carry at least one hydrophilic group or a potentially hydrophilic group, thus achieving the water-dispersibility of polyurethanes, d) if desired, further polyfunctional compounds which are different from the monomers (a) to (c) and contain reactive groups which are alcoholic hydroxyl groups, primary or secondary amino groups or isocyanate groups, and e) if desired, monofunctional compounds which are different from the monomers (a) to (c) and contain one reactive group, which is an alcoholic hydroxyl group, a primary or secondary amino group or an isocyanate group.

Aqueous polyurethane dispersions are known in general terms and are described, for example, in G. Oertel "Kunststoff Handbuch", Volume 7, Chapter 2.4.1, 2nd Edition, 1983, Hanser Verlag, Munich, Vienna.

These polyurethane dispersions are used as coating compositions for coating various substrates, such as leather, wood, metal, plastics, paper or textiles, the properties of the dispersions being matched to the planned use of the coated articles and the properties of the respective substrate.

Polyurethane dispersions which are used as coating compositions for leather should impart the following properties to the leather:

low tendency to stick during ironing and stacking insensitivity to water and moisture high long-term flexural strength good abrasion resistance and scrub resistance, and a pleasant hand typical of leather.

Aqueous polyurethane dispersions which are specifically recommended as coating compositions for leather are described in DE-A-26 45 779.

The polyurethanes are built up from dihydroxyl compounds having a molecular weight of from 500 to 5000, a combination of aromatic and aliphatic or cycloaliphatic diisocyanates, where the (cyclo)aliphatic component makes up from 10 to 50 mol %, water-soluble salts of aliphatic aminocarboxylic or -sulfonic acids containing at least one hydrogen atom bonded to nitrogen, and compounds containing at least 2 isocyanate-reactive hydrogen atoms.

The synthesis of the polyurethane starts either from the aromatic component or a mixture of the aromatic and nonaromatic isocyanates. Leather coated with these dispersions is still unsatisfactory regarding its tack and its resistance to water or moisture.

EP-A-0 647 667 discloses aqueous dispersions which are obtained by partially reacting an isocyanate-terminated urethane prepolymer with a salt of an organic acid which is monofunctional with respect to groups which are reactive with isocyanate groups, and extending the chain of the remaining isocyanate groups by means of a polyamine. Recommended components for synthesis of the urethane prepolymer are an extensive list of compounds, including polyester-polyols built up from alkyl- and alkenylsuccinic acids. Water-free films of these dispersions are tacky and cannot be used as coating compositions for leather.

It is an object of the present invention to provide an aqueous polyurethane dispersion which is suitable as a coating composition for leather and imparts good use properties to the leather during service and production.

We have found that this object is achieved by the aqueous dispersions defined at the outset.

Suitable monomers (a) are the diisocyanates usually employed in polyurethane chemistry.

Particular mention should be made of diisocyanates $X(NCO)_2$, where X is an aliphatic hydrocarbon radical having 4 to 12 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis-(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetra-methylxylylene diisocyanate (TMXDI), the isomers of bis(4-isocyanatocyclohexyl)methane, and mixtures of these compounds.

Particularly important mixtures of these isocyanates are the mixtures of the respective structural isomers of diisocyanatotoluene and diisocyanatodiphenylmethane, in particular the mixture of 80 mol % of 2,4-diisocyanatotoluene and 20 mol % of 2,6-diisocyanatotoluene. Also particularly advantageous are the mixtures of aromatic isocyanates, such as 2,4-diisocyanatotoluene and/or 2,6-diisocyanatotolunene, with aliphatic or cycloaliphatic isocyanates, such as hexamethylene diisocyanate or IPDI, the preferred mixing ratio between the aliphatic isocyanates and the aromatic isocyanates being from 4:1 to 1:4.

The diols (b1) employed are from 10 to 100 mol %, preferably from 30 to 100 mol %, particularly preferably from 50 to 100 mol %, based on the total amount of the diols (b), of polyesterols which have a molecular weight of from 500 to 5000, preferably from 800 to 3000, and are built up from b1.1) ($C_4$- to $C_{30}$-alkyl)succinic acid and/or ($C_4$- to $C_{30}$-alkenyl)succinic acid, b1.2) from 0 to 60 mol %, preferably from 0 to 30 mol %, based on component (b1.1), of a dicarboxylic acid which is different from component (b1.1), and b1.3) a diol having a molecular weight of from 60 to 500 g/mol.

The ($C_4$- to $C_{30}$-alkenyl)succinic acids are preferably compounds of the formula I

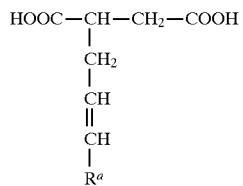

where $R^a$ is $C_1$–$C_{27}$-alkyl, particularly preferably an unbranched radical having 1 to 27 carbon atoms.

These are commercially available compounds which are obtainable by reacting α-olefins with maleic anhydrides. The preparation is described, for example, in "Maleic Anhydride Derivatives" by L. H. Flett & W. H. Gardner, 1952, John Wiley & Sons Inc., and in U.S. Pat. Nos. 2,561,231, 2,561,791, 2,573,495 and 2,496,358.

The preferred ($C_4$- to $C_{30}$-alkyl)succinic acids are those obtainable from ($C_4$- to $C_{30}$-alkenyl)succinic acids by hydrogenation of the double bond.

The dicarboxylic acids (b1.2) are those which are generally conventional in the preparation of polyesters (cf. Ullmanns Encyklopädie der technischen Chemie, 4th Edition, Volume 19, pp. 62 to 65). They can be aliphatic, cycloaliphatic, araliphatic, aromatic or heterocyclic and can be unsubstituted or substituted, for example by halogen atoms, and/or unsaturated. Examples thereof which may be mentioned are suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids. Preference is given to dicarboxylic acids of the formula HOOC—$(CH_2)_y$—COOH, where y is a number from 1 to 20, preferably an even number from 2 to 20, for example sucinic acid, adipic acid, dodecanedicarboxylic acid and sebacic acid.

The diols (b1.3) are likewise those which are generally employed in the preparation of polyesters. These are, for example, ethylene glycol, propane-1,2-diol, propan-1,3-diol, butane-1,3-diol, butene-1,4-diol, butyne-1,4-diol, pentane-1,5-diol, neopentyl glycol, bis-(hydroxymethyl) cyclohexanes, such as 1,4-bis-(hydroxymethyl) cyclohexane, 2-methylpropane-1,3-diol, methylpentanediols, furthermore diethylene glycol, triethylene glycol, tetra-ethylene glycol, polyethylene glycol, dipropylene glycol, polypropylene glycol, dibutylene glycol and polybutylene glycols. Preference is given to alcohols of the formula HO—$(CH_2)_x$—OH, where x is a number from 1 to 20. Examples thereof are ethylene glycol, butane-1,4-diol, hexane-1,6-diol, octan-1,8-diol and dodecane-1,12-diol, and mixtures of these compounds.

The hardness and modulus of elasticity of the polyurethanes can be increased if, in addition to the diols (b1), low-molecular-weight diols (b2) having a molecular weight of from about 62 to 500 g/mol, preferably from 62 to 200 g/mol, are employed as diols (b).

Suitable diols (b2) are the same as can be employed as diols (b1.3).

The diols (b3) are, in particular, polyester-polyols which are known, for example, from Ullmanns Encyklopädie der technischen Chemie, 4th Edition, Volume 19, pp. 62 to 65. Preference is given to polyester-polyols obtained by reacting dihydric alcohols with dibasic carboxylic acids. It is also possible to replace the free polycarboxylic acids by the corresponding polycarboxylic anhydrides or corresponding polycarboxylic esters of lower alcohols, or mixtures thereof, in the preparation of the polyester-polyols. The polycarboxylic acids can be aliphatic, cycloaliphatic, araliphatic, aromatic or heterocyclic, and can be unsubstituted or substituted, for example by halogen atoms, and/or unsaturated. Preference is given here to those which are suitable as dicarboxylic acids (b1.2). Suitable diols in the synthesis of these polyesters (b3) are likewise those mentioned as diols (b1.3).

Suitable diols (b3) also include polycarbonate-diols, as can be obtained, for example, by reacting phosgene with an excess of the low-molecular-weight alcohols mentioned as synthesis components for the polyester-polyols.

Also suitable are lactone-based polyester-diols, these being homopolymers or copolymers of lactones, preferably products obtained by the addition reaction of lactones onto suitable difunctional initiator molecules and containing terminal hydroxyl groups. Preferred lactones are those derived from compounds of the formula HO—$(CH_2)_z$—COOH, where z is a number from 1 to 20. Examples are ε-caprolactone, β-propiolactone, gamma-butyrolactone and methyl-ε-caprolactone, and mixtures thereof.

Also suitable as component (b3) are polyether-diols. These are obtainable, in particular, by polymerization of ethylene oxide, propylene oxide, butylene oxide, tetrahydrofuran, styrene oxide or epichlorohydrin alone, for example in the presence of $BF_3$ or by the addition reaction of these compounds, as a mixture or successively, onto initiator components containing reactive hydrogen atoms, such as alcohols or amines, for example water, ethylene glycol, propane-1,2-diol, propane-1,3-diol, 1,2-bis(4-hydroxydiphenyl)propane or aniline. Particular preference is given to polytetrahydrofuran having a molecular weight of from 240 to 5000, especially from 500 to 4500.

Dispersions having particularly good application properties are obtained, in particular, if the proportion of component (b1) and the proportion of component (b1.1) in the component (b1) are selected so that the structural unit derived from component (b1.1) by abstraction of the two acid protons is at least 10% by weight, preferably from 20 to 60% by weight, based on the amount by weight of all of component (b).

In order to achieve water-dispersibility, the polyurethanes are built up from, besides components (a), (b), (d) and (e), monomers (c) which are different from components (a), (b) and (d) and carry at least two isocyanate groups or at least two isocyanate-reactive groups and in addition carry at least one hydrophilic group or a group which can be converted into a hydrophilic group. The term "hydrophilic groups or potentially hydrophilic groups" below is abbreviated to "(potentially) hydrophilic groups". The (potentially) hydrophilic groups react with isocyanates significantly more slowly than do the functional groups of the monomers used to build up the main polymer chain.

The proportion of components containing (potentially) hydrophilic groups in the total amount of components (a), (b), (c) and (d) is generally set at such a level that the molar amount of the (potentially) hydrophilic groups, based on the amount by weight of all monomers (a) to (d), is from 30 to 1000 mmol/kg, preferably from 50 to 600 mmol/kg, particularly preferably from 80 to 400 mmol/kg.

The (potentially) hydrophilic groups can be nonionic or preferably (potentially) ionic hydrophilic groups.

Suitable nonionic hydrophilic groups are, in particular, polyethylene glycol ethers comprising 5 to 100, preferably 10 to 80, recurring ethylene oxide units. The polyethylene oxide units content is generally from 0 to 15% by weight, preferably from 0 to 10% by weight, based on the total amount of all monomers (a) to (d).

Preferred monomers containing nonionic hydrophilic groups are the products of reaction of a polyethylene glycol and a diisocyanate, carrying a terminally etherified polyethylene glycol radical. Such diisocyanates and processes for their preparation are described in U.S. Pat. No. 3,905,929 and U.S. Pat. No. 3,920,598.

Ionic hydrophilic groups are, in particular, anionic groups, such as sulfonate, carboxylate and phosphate groups, in the form of their alkali metal or ammonium salts, and cationic groups, such as ammonium groups, in particular protonated tertiary amino groups or quaternary ammonium groups.

Potentially ionic hydrophilic groups are in particular those which can be converted into the abovementioned ionic hydrophilic groups by simple neutralization, hydrolysis or quaternization reactions, i.e., for example, carboxyl groups, anhydride groups and tertiary amino groups.

(Potentially) ionic monomers (c) are described in detail in, for example, Ullmanns Encyklopädie der technischen Chemie, 4th Edition, Volume 19, pp. 311–313 and, for example, in DE-A 1 495 745.

(Potentially) cationic monomers (c) of particular practical importance are in particular monomers containing tertiary amino groups, for example tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, where the alkyl radicals and alkanediyl units in these tertiary amines comprise, independently of one another, from 2 to 6 carbon atoms.

These tertiary amines are converted into the ammonium salts either using acids, preferably strong mineral acids, such as phosphoric acid, sulfuric acid or hydrohalic acid, or strong organic acids or by reaction with suitable quaternizing agents, such as $C_1$- to $C_6$-alkyl halides, for example bromides or chlorides.

Suitable monomers containing (potentially) anionic groups are usually aliphatic, cycloaliphatic, araliphatic or aromatic carboxylic acids and sulfonic acids carrying at least one alcoholic hydroxyl group or at least one primary or secondary amino group. Preference is given to dihydroxyalkylcarboxylic acids, in particular having 3 to 10 carbon atoms, as also described in U.S. Pat. No. 3,412,054. Particular preference is given to compounds of the formula

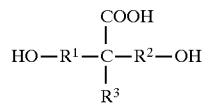

where $R^1$ and $R^2$ are $C_1$- to $C_4$-alkanediyl and $R^3$ is $C_1$- to $C_4$-alkyl, especially dimethylolpropionic acid (DMPA).

Also suitable are corresponding dihydroxysulfonic acids and dihydroxyphosphonic acids, such as 2,3-dihydroxypropanephosphonic acid.

Also suitable are the dihydroxyl compounds disclosed in DE-A 3 911 827 which have a molecular weight of from 500 to 10000 g/mol and contain at least 2 carboxylate groups.

Suitable monomers (c) containing isocyanate-reactive amino groups are aminocarboxylic acids, such as lysine, β-alanine, the adducts of aliphatic diprimary diamines with α,β-unsaturated carboxylic acids that are mentioned in DE-A 2034479, such as the N-(2-aminoethyl)-2-aminoethanecarboxylic acid, and the corresponding N-aminoalkylaminoalkylcarboxylic acids, in which the alkanediyl units comprise 2 to 6 carbon atoms.

If monomers containing potentially ionic groups are employed, they can be converted into the ionic form before, during or preferably after the isocyanate polyaddition reaction, since the ionic monomers frequently have only limited solubility in the reaction mixture. The carboxylate groups are particularly preferably in the form of their salts with an alkali metal ion or an ammonium ion as counterion.

The monomers (d), which are different from the monomers (a) to (c), generally serve for crosslinking or chain extension. They are generally nonaromatic alcohols containing 2 or more hydroxyl groups, amines containing 2 or more primary and/or secondary amino groups and compounds which, in addition to one or more alcoholic hydroxyl groups, also carry one or more primary and/or secondary amino groups.

Polyamines containing 2 or more primary and/or secondary amino groups are employed in particular if the chain extension or crosslinking is to take place in the presence of water, since amines generally react with isocyanates more quickly than do alcohols or water. This is frequently necessary if aqueous dispersions of crosslinked polyurethanes of polyurethanes of high molecular weight are desired. In such cases, prepolymers containing isocyanate groups are prepared, rapidly dispersed in water and subsequently chain-extended or crosslinked by addition of compounds containing a plurality of isocyanate-reactive amino groups.

Amines which are suitable for this purpose are generally polyfunctional amines having a molecular weight in the range from 32 to 500 g/mol, preferably from 60 to 300 g/mol, and containing at least two primary, two secondary or one primary and one secondary amino group. Examples thereof are diamines, such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines, such as diethylenetriamine or 1,8-diamino-4-aminomethyloctane.

The amines can also be employed in blocked form, for example in the form of the corresponding ketimines (see, for example, CA-1,129,128), ketazines (cf., for example, U.S. Pat. No. 4,269,748) or amine salts (see U.S. Pat. No. 4,292,226).

Preference is given to mixtures of diamines and triamines, particularly preferably mixtures of isophoronediamine and diethylenetriamine.

The monomer (d) in the polyurethanes is preferably not a polyamine or from 1 to 10 mol %, particularly preferably from 4 to 8 mol %, based on the total amount of components (b) and (d), of a polyamine containing at least 2 isocyanate-reactive amino groups.

Alcohols having a functionality of greater than 2 which can serve to establish a certain degree of branching or crosslinking are, for example, trimethylol propane, glycerol or sugar.

For the same purpose, it is also possible to employ trivalent and tetravalent isocyanates as monomer (d). Examples of commercially available compounds are the isocyanurate or the biuret of hexamethylene diisocyanate.

Monomers (e) which can be used concomitantly if desired are monoisocyanates, monoalcohols and primary and secondary monoamines. In general, their proportion is at most 8 mol %, based on the total molar amount of the monomers. These monofunctional compounds usually carry further functional groups, such as olefinic groups or carbonyl groups, and serve to introduce functional groups into the polyurethane which enable dispersion or cross-linking or further polymer-analogous reaction of the polyurethane. Suitable monomers for this purpose are isopropenyl α,α-dimethylbenzylisocyanate (TMI) and esters of acrylic or methacrylic acid, such as hydroxyethyl acrylate or hydroxyethyl methacrylate.

It is generally known in the area of polyurethane chemistry how the molecular weight of the polyurethanes can be adjusted through choice of proportions of the mutually reactive monomers and the arithmetic mean of the number of reactive functional groups per molecule.

Normally, components (a), (b), (c) and (d) and their respective molar amounts are selected so that the A:B ratio, where A) is the molar amount of isocyanate groups, and
B) is the sum of the molar amount of hydroxyl groups and the molar amount of functional groups which are able to react with isocyanates in an addition reaction, is from 0.5:1 to 2:1, preferably from 0.8:1 to 1.5:1, particularly preferably from 0.9:1 to 1.2:1. The A:B ratio is very particularly preferably as close as possible to 1:1.

The monomers (a) to (e) employed usually carry on average from 1.5 to 2.5, preferably from 1.9 to 2.1, particularly preferably 2.0, isocyanate groups or functional groups which are able to react with isocyanates in an addition reaction.

The polyaddition of components (a) to (e) is generally carried out by known processes, preferably by the so-called "acetone process" or the "prepolymer mixing process", which are disclosed, for example, in DE-A-4418157.

The procedure is generally first to prepare a prepolymer or the polyurethane in an inert organic solvent and subsequently to disperse the prepolymer or the polyurethane in water. In the case of the prepolymer, the conversion into the polyurethane is carried out by reaction with the water or by a subsequently added amine (component d). All or some of the solvent is usually removed by distillation, after the dispersion operation.

The dispersions generally have a solids content of from 10 to 75% by weight, preferably from 20 to 65% by weight, and a viscosity of from 10 to 500 mPa.s (measured at 20° C. and a shear rate of 250 s$^{-1}$).

Hydrophobic auxiliaries, which can be difficult to disperse homogeneously in the finished dispersion, for example phenol condensation resins made from aldehydes and phenol or phenol derivatives, or epoxy resins and further polymers which serve, for example, as adhesion improvers in polyurethane dispersions and are mentioned, for example, in DE-A 39 03 538, 43 09 079 and 40 24 567, can be added to the polyurethane or the prepolymer even before the dispersion operation by the methods described in the two specifications mentioned above.

The novel dispersions can be used alone or as mixtures with other similarly laden dispersions of homopolymers or copolymers of, for example, acrylic or methacrylic esters, styrene or butadiene.

The novel aqueous polyurethane dispersions are advantageously suitable as coating compositions for a wide variety of substrates, for example, leather, paper, textiles, plastic or metal. They can be applied to the substrates by conventional methods, for example by spraying, knife coating or pouring.

The dispersions are furthermore suitable for adhesive bonding of a wide variety of substrates. To this end, the dispersions are applied to one or both of the surfaces to be bonded to one another, and the surfaces are brought into contact, preferably using pressure, before or after the dispersion has dried.

PREPARATION EXAMPLES

A. Preparation of component (b1.1a)

A mixture of 108.0 kg of an α-C12/14-olefin mixture (about 2:1), 1.63 kg of fumaric acid and 0.82 kg of hydroquinone monomethyl ether was warmed to 160° C. with stirring under a nitrogen atmosphere. A melt of 54.5 kg of maleic anhydride was metered in, and the reaction mixture was warmed to 200° C. and held at this temperature for 8 hours. Unreacted olefin was subsequently removed by distillation under reduced pressure at 100° C., and the crude product was purified by means of a thin film evaporator. Product: brown liquid;

Anhydride number: 199 mg of KOH/g.

B. Preparation of component (b1.a)

The corresponding polyester-diol (polyester-diol b1.a) was also prepared by a conventional method (cf. "Kunststoff Handbuch Volume 7", Chapter 3.1.2, pages 57 to 62, Günter Oertel, 2nd Edition, 1983, Hanser Verlag, Munich, Vienna) from 7.03 kg of component (b1.1a) and 3.40 kg of hexane-1,6-diol. The polyester-diol had a hydroxyl number of 56.

C. Preparation of the dispersions

Abbreviations
TMXDI tetramethylxylylene diisocyanate
EDA ethylenediamine
IPDI isophorone diisocyanate
HMDI dicyclohexylmethane diisocyanate
IPDA isophoronediamine
DETA diethylenetriamine
DMPA dimethylolpropionic acid Example 1

A mixture of 62.3 g (0.28 mol) of IPDI and 74.0 g (0.28 mol) of HMDI was added to 400 g (0.200 mol) of the polyester-ol (b1.a), and the mixture was stirred at 70° C. for 70 minutes. 18.0 g (0.2 mol) of butane-1,4diol were then added, and the components were reacted at 70° C. for a further 90 minutes. The mixture was then diluted with 520 g of acetone, and reacted at 50° C. with 37.8 g of a 40% strength aqueous solution of the adduct of ethylene diamine and sodium acrylate. The mixture was then dispersed in 1000 g of water, and, after 15 minutes, a solution of 1.7 g (0.01 mol) of IPDA and 3.8 g (0.037 mol) of DETA was added. The acetone was then stripped off under reduced pressure, giving a finely divided dispersion having a solids content of 36.0%.

Comparative Example 1 (C1)

A mixture of 62.3 g (0.28 mol) of IPDI and 74.0 g (0.28 mol) of HMDI was added to 400 g (0.200 mol) of a polyester-ol having an OH number of 56 made from adipic acid, hexanediol and neopentyl glycol, and the mixture was stirred at 70° C. for 70 minutes. 18.0 g (0.2 mol) of butane-1,4-diol were then added, and the components were reacted at 70° C. for a further 90 minutes. The mixture was then diluted with 520 g of acetone, and reacted at 50° C. with 37.8 g of a 40% strength aqueous solution of the adduct of ethylene diamine and sodium acrylate. The mixture was then dispersed in 1000 g of water. The acetone was then stripped off under reduced pressure, giving a finely divided dispersion having a solids content of 35.0%.

Example 2

126.0 g (0.567 mol) of IPDI were added to a mixture of 400 g (0.2 mol) of the polyester-ol from Example 1, 36.0 g (0.269 mol) of DMPA and 0.25 g of DBTL, and the mixture was stirred at 100° C. for 180 minutes. The resultant prepolymer was dissolved in 600 g of acetone and at the same time cooled to 30° C. First 25.9 g (0.256 mol) of TEA and then 1100 g of water were then stirred in. Immediately thereafter, 6.9 g (0.067 mol) of DETA in 400 g of water were stirred in. The acetone was then stripped off under reduced pressure, giving a finely divided dispersion having a solids content of 28.4%.

Comparative Example 2 (C2)

126.0 g (0.567 mol) of IPDI were added to a mixture of 400 g (0.2 mol) of the polyester-ol from Comparative Example 1, 36.0 g (0.269 mol) of DMPA and 0.25 g of DBTL, and the mixture was stirred at 100° C. for 180 minutes. The resultant prepolymer was dissolved in 600 g of acetone and at the same time cooled to 30° C. First 25.9 g (0.256 mol) of TEA and then 1100 g of water were then stirred in. Immediately thereafter, 6.9 g (0.067 mol) of DETA in 400 g of water were stirred in. The acetone was then stripped off under reduced pressure, giving a finely divided dispersion having a solids content of 28.4%.

Comparative Example 3 (corresponds substantially to Example 1 from EP-A-647 667) (C3)

281.6 g (0.141 mol) of the polyester-ol (b1.a) and 17.6 g (0.169 mol) of neopentyl glycol were initially introduced together at 130° C. 30.9 g (0.177 mol) of TDI and 14.5 g (0.059 mol) of TMXDI were metered in this melt, and the mixture was stirred until the NCO content was 0%. After the mixture had been cooled to 70° C., 15.7 g (0.133 mol) of hexanediol were added, and, when it had dissolved, a further 69.8 g (0.286 mol) of TMXDI were metered in. When the NCO value was 1.8%, 68.5 g (0.116 mol) of a 25% aqueous solution of sodium taurate were stirred in. After 10 minutes, a solution of 2.4 g (0.040 mol) of EDA in 124 g of water was added and stirred in while the temperature rose to 85° C. After about 30 minutes, the mixture was diluted to the final solids content by means of 323.3 g of water.

Applicational testing

The dispersions from Examples 1 and 2 and Comparative Examples 1, 2 and 3 were converted analogously into vehicles for primers.

To this end, a mixture of 100 g of a commercially available pigment preparation
335 or 420 g of the dispersion from Example 1 or C1 or from Example 2 or C2 (the different amounts depend on the solids content of the dispersions; gives 120 g of polymer solids) and
665 or 580 g of water was applied to box side leather.

The total application rate was 40 g of dry material/m². The application comprised two spray coats, leather being dried at 80° C. after each coat and subsequently ironed in a hydraulic ball press at 80° C. and 50 bar.

The leather test results are shown in Table 1.

The long-term flexural strength test was carried out in accordance with DIN 53 351/IUP 20 (method of physical testing of leather) using the Bally flexometer:

TABLE 1

| Dispersion | Flex.[1] dry/wet | Cold flex[2] −10° C. | Flex. after storage[3]* | Stack adhesion[4] |
|---|---|---|---|---|
| Ex. 1 | 0/0 | 0 | 0 | 2–3 |
| Comp. 1 | 0/0 | 0 | h | 1 |
| Ex. 2 | 0/0 | 0 | 0 | 4 |
| Comp. 2 | 0/0 | 0 | m | 2 |
| Comp. 3 | unusable* | | | |

*sticks strongly
[1]Flexometer test dry after 50 000 flexes or wet after 20 000 flexes
[2]Cold flex at −10° C. after 30 000 flexes
[3]Flexometer test after storage of the finished leather for 7 days at 80° C. and 95% relative atmospheric humidity with the following test after 50 000 flexes.
Flexometer scores:
0 no damage,
s slight damage,
m moderate damage,
h heavy damage,
[4]In order to test the stack adhesion, the finished (coated) sides of two leather surfaces measuring 60 × 75 mm were laid one on top of the other and stored for 10 hours at 40° C. under a load of 5 kg. After cooling, the adhesive behavior on separation of the leather surfaces was assessed. Assessment 1–5.
1 completely stuck, very badly damaged surface
2 moderately stuck and damaged
3 some sticking and damage
4 little sticking, no damage
5 no sticking, surfaces separate easily

We claim:

1. An aqueous dispersion containing a polyurethane built up from a) diisocyanates having 4 to 30 carbon atoms,
b) diols, of which
   b.1) from 10 to 100 mol %, based on the total amount of the diols (b), have a molecular weight of from 500 to 5000 and are built up from
      b1.1) ($C_4$- to $C_{30}$-alkyl)succinic acid and/or ($C_4$- to $C_{30}$-alkenyl)succinic acid,
      b1.2) from 0 to 60 mol %, based on component (b1.1), of a dicarboxylic acid which is different from component (b1.1), and
      b1.3) a diol having a molecular weight of from 60 to 500 g/mol,
   b.2) from 0 to 90 mol %, based on the total amount of the diols (b), have a molecular weight of from 60 to 500 g/mol, and
   b.3) from 0 to 90 mol %, based on the total amount of the diols (b), have a molecular weight of from 500 to 5000 g/mol and are different from (b1),
c) monomers which are different from the monomers (a) and (b) and contain at least 2 isocyanate groups or at least 2 isocyanate-reactive groups and which in addition carry at least one hydrophilic group or a potentially hydrophilic group, thus achieving the water-dispersibility of polyurethanes,
d) if desired, further polyfunctional compounds which are different from the monomers (a) to (c) and contain reactive groups which are alcoholic hydroxyl groups, primary or secondary amino groups or isocyanate groups, and
e) if desired, monofunctional compounds which are different from the monomers (a) to (c) and contain one reactive group, which is an alcoholic hydroxyl group, a primary or secondary amino group or an isocyanate group.

2. An aqueous dispersion as claimed in claim 1, where component (b1.1) is a compound of the formula I

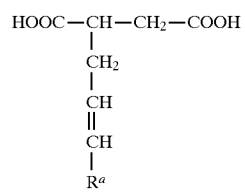
where $R^a$ is $C_1$–$C_{27}$-alkyl.
3. A method comprising coating or adhering leather, paper, textiles, plastics or metals with an aqueous dispersion as claimed in claim 1 or 2.
4. An article made from leather, paper, textiles, plastic or metal which is coated or bonded by means of an aqueous dispersion as claimed in claim 1 or 2.
* * * * *